United States Patent

[11] 3,619,147

| [72] | Inventors | Carl K. Amano<br>Denver;<br>Clifford J. Lewis, Lakewood, both of Colo. |
|---|---|---|
| [21] | Appl. No. | 838,723 |
| [22] | Filed | June 12, 1969 |
| [45] | Patented | Nov. 9, 1971 |
| [73] | Assignee | Brameda Resources Limited<br>Vancouver, British Columbia, Canada |

[54] SULFUR EXTRACTION IN PRESENCE OF AN ALKALINE MATERIAL AND INCLUDING WATER SEPARATION, SOLVENT RECYCLE AND DRY SEAL VAPOR LOCK
5 Claims, 2 Drawing Figs.

[52] U.S. Cl. ..................................................... 23/299,
 23/312 S, 23/308 S
[51] Int. Cl. .................................................. B01d 9/02,
 B01d 11/02, C01b 17/08
[50] Field of Search ........................................... 23/312,
 310, 308, 309, 298, 299, 300, 224

[56] References Cited
UNITED STATES PATENTS

| 166,279 | 8/1875 | Johnson | 23/312 |
|---|---|---|---|
| 927,342 | 7/1909 | Feld | 23/312 |
| 1,253,571 | 1/1918 | Bonneau | 23/312 X |
| 1,963,921 | 6/1934 | Nagelvoort | 23/312 X |
| 2,316,673 | 4/1943 | McDonald | 23/299 |
| 2,409,408 | 10/1946 | Tweeddale | 23/312 |
| 2,798,034 | 7/1957 | Egbert | 23/312 |
| 2,806,770 | 9/1957 | Hutchins | 23/310 |
| 2,890,941 | 6/1959 | Bartlett | 23/310 |
| 2,934,414 | 4/1960 | Bradley | 23/312 |
| 2,785,059 | 3/1957 | McDonald | 23/312 X |

*Primary Examiner*—Norman Yudkoff
*Assistant Examiner*—S. J. Emery
*Attorney*—Featherstonhaugh & Co.

ABSTRACT: This invention relates to a process and apparatus wherein a solvent for dissolving and recovering sulfur from sulfur bearing ore or concentrate may be continuously recycled and reused without loss. The invention further involves a closed, sealed system so constructed as to prevent the loss of any solvent during the processing of the sulfur ore or concentrate while, nevertheless, obtaining pure sulfur from each cycle. The process and apparatus of the present invention provide means for initially leaching a crushed sulfur ore or concentrate and thereafter passing the resultant slurry to a separator for the separation of the leached residue from the sulfur saturated or rich solvent. Thereafter, water is separated from the sulfur saturated solvent and the solvent is fed into a crystallizer from which extremely pure elemental sulfur is obtained. After passing through the crystallizer, the elemental sulfur is separated from the solvent, the sulfur is dried, resulting in a pure end product and the solvent is recycled to the initial steps of the process. At each point in the processing operation, wherein vaporized solvent may be present, the solvent vapors are returned to a condenser and thereafter recycled as practically pure solvent to the system. The leached residue itself is recovered in such condition that whatever minerals are present are sulfur-free and such minerals are easily recoverable.

INVENTORS
CLIFFORD J. LEWIS
CARL K. AMANO
BY
MARCH, LeFEVER & WYATT
ATTORNEYS

SULFUR EXTRACTION IN PRESENCE OF AN ALKALINE MATERIAL AND INCLUDING WATER SEPARATION, SOLVENT RECYCLE AND DRY SEAL VAPOR LOCK

BACKGROUND OF THE INVENTION

Heretofore, a process and apparatus has been provided for recycling and reusing sulfur solvent in a system which ultimately produces pure elemental sulfur. This process which is described in application Ser. No. 759,828 results now U.S. Pat. 3,535,089, issued Oct. 20, 1970, in an end product of pure sulfur while recapturing the solvent for reuse in each cycle. However, this process requires equipment and apparatus of large size in order to produce elemental sulfur in quantities desired for commercial production. The aforesaid process constitutes a breakthrough over any presently existing system and is economical as opposed to the process and apparatus of the prior art. Nevertheless, there is need for a process embodying apparatus which is equally, if not more efficient, and which does not require oversized equipment but which, instead, may be economically used in a much smaller area and with a reduced initial capital expenditure.

It is therefore an object of the present invention to provide an economical and practical process and apparatus which prevents solvent loss and provides for the production of extremely high grade elemental sulfur from sulfur bearing ores or concentrates.

A further object of the present invention is to provide, in economical form, a leak-proof and vapor-tight system wherein practically all of the solvent introduced initially may be recycled and reused without loss at any point along the processing line.

A further object of the present invention is to provide a process and apparatus wherein solvent may be recovered in vapor form throughout the system and thereafter condensed for return to the process as well as recovering the solvent at the terminus in liquid form to be recycled and reused.

An advantage of the present invention is the simple and economical apparatus which may be utilized without complex arrangements or equipment while nevertheless providing for the recovery of practically all of the solvent and of an elemental sulfur of extremely high grade.

Another advantage of the present invention is that with the use of the process and apparatus set forth, there is virtually no need for replacement of the equipment as there is no appreciable corrosion or other wear in any portion of the apparatus which may remain completely sealed during the normal processing operations.

A feature of the present invention is that the liquid solvent recovered at the end of the processing operation is recycled through the initial extraction steps of the processing, while the solvent vapors recovered during the processing are condensed and returned as pure solvent intermediate the processing operation. Thus, the solvent is used to dissolve sulfur from the ore or concentrate in the initial extraction stages and thereafter, to completely remove any entrained sulfur which may be present after the initial extraction steps are concluded. In effect, therefore, the major portion of the sulfur is dissolved by recycled lean solvent in the first extraction stages and any sulfur remaining in the leached residue is washed from the leached residue during the processing operation upon final contact with the condensed pure solvent.

Still another feature of the present invention is the recovery of minerals from the leached residue itself without sulfur which may be considered an impurity in the recovery of other minerals. The leached residue is presented in such condition that the minerals therefrom may be recovered by well-known methods such as flotation or the like, without additional processing to remove the impurities such as sulfur.

Other objects and advantages and features will be set forth in the following specification which describes an example of one form of the apparatus taken in conjunction with the drawings. It is to be understood that the description is not intended to be limited to the specific forms of apparatus disclosed nor the location thereof, but that modifications may be made without departing in any way from the spirit of the invention.

DETAILED DESCRIPTION

Figure 1:
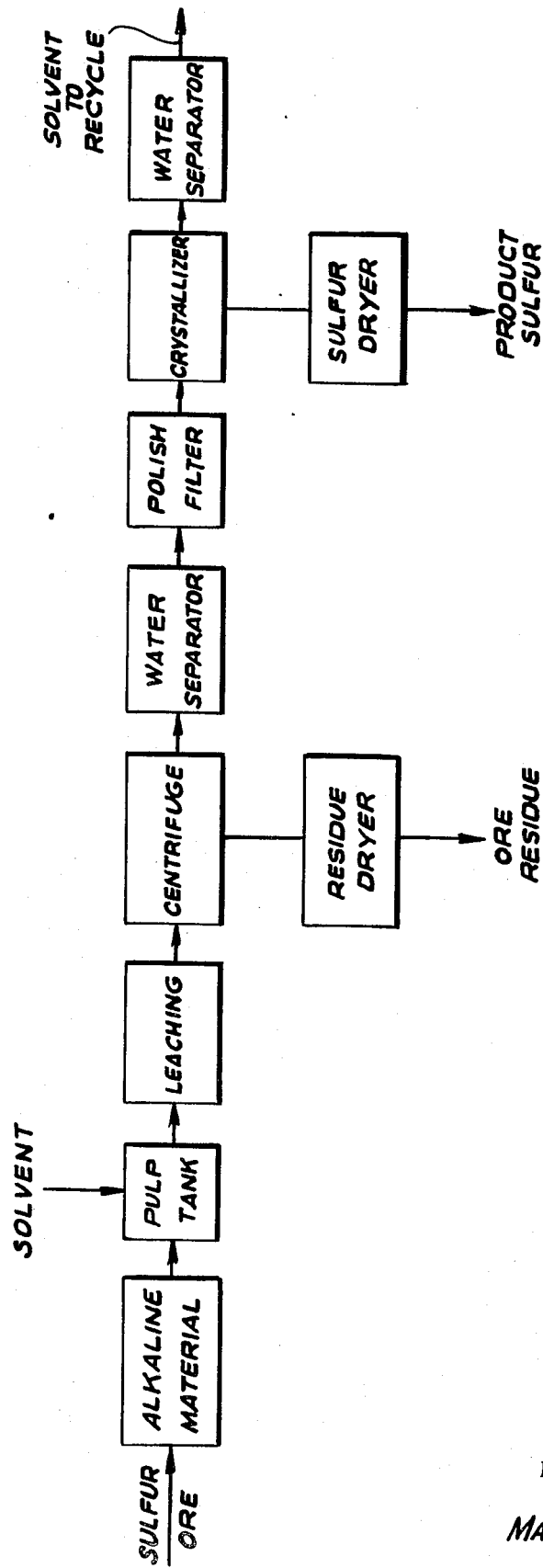
FIG. 1 is a process block diagram illustrating the sequences of the processing steps and the apparatus for performing this process.
Figure 2:
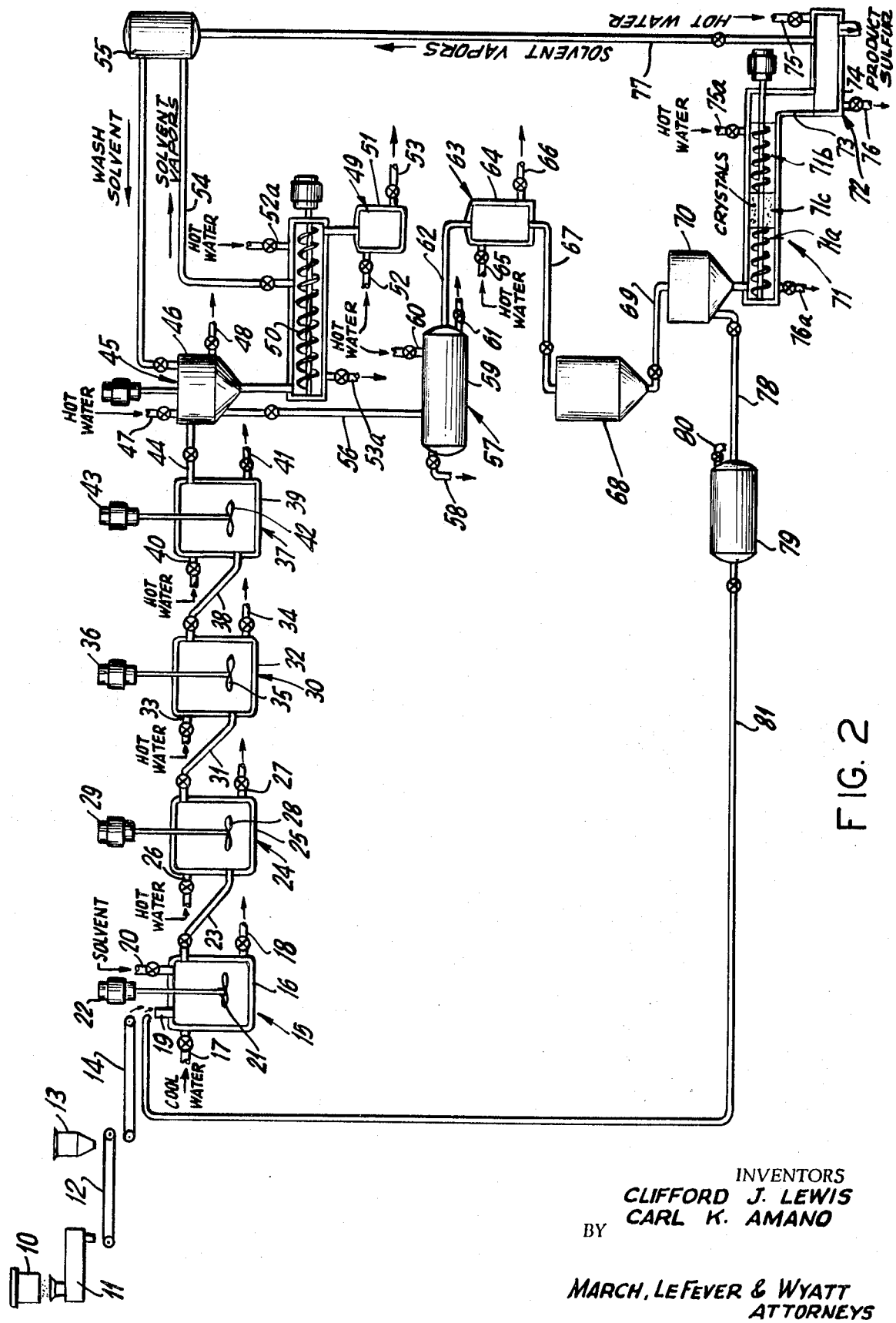
FIG. 2 is a schematic diagram setting forth the process flow and the apparatus in more detail.

As will be noted from am inspection of the drawings, the process and apparatus of the present invention are economical to produce and assemble while nevertheless providing for the recovery of high grade elemental sulfur without loss of the solvent utilized in the processing. In essence, the invention comprises the steps of leaching, separating the leached residue from the sulfur saturated solvent, crystallizing the sulfur, recovering the solvent vapors from various stages in the process, condensing the vapors to produce pure liquid solvent for recycling in the system, and recovering the liquid solvent from the terminus of the cycle for reuse.

In the following description, the solvent is from time to time described as trichloroethylene. However, it will be understood that this solvent is set forth merely for illustrative purposes and that other solvents for sulfur which are vaporizable below the melting point of sulfur under normal or adjusted atmospheric conditions, such as perchloroethylene, liquid hydrocarbon solvents, etc., may be used. In addition solvents may be combined, if desired, so that their vaporizing temperature may be adjusted to extract more sulfur from the ore in the leaching step.

At the beginning of the process, the acidity of the ore herein called the pH of the ore is adjusted by the use of an alkaline substance such as crushed or powdered limestone. This pH adjustment is more fully described in application Ser. No. 759,828 which is copending herewith.

Sulfur bearing ore, containing, for example, from 20 to 30 percent sulfur, is finely divided as by a crusher 10 and passed to a hopper or storage vessel 11. The sulfur bearing ore, preferably of a particulate size not to exceed one-quarter inch, is then admixed with an amount of an alkaline material in a quantity such that the total mixture when in the presence of water, has a pH of about 3 to about 9, and preferably 4 to 7. The alkaline materials may be crushed limestone, soda ash, trona or the like, with crushed limestone being preferred. The alkaline material may be added in dry finely divided form by spreading it evenly on the surface of the ore on conveyor 12, carrying the crushed ore from the storage vessel 11. The alkaline substance is spread from a hopper and trough 13 over the crushed sulfur ore as it moves onto the conveyor 14. Samples of the crushed ore from the moving bed may then be taken for analytical and control procedures as by means of an automatic sampling device (not shown).

The crushing means, storage hopper and transfer means to the slurry vessel may, of course, be arranged in any convenient manner which is adapted to the physical requirements of the process layout. Thereafter, the pH adjusted ore or concentrate is fed into a pulp tank 15 which is completely sealed to prevent any solvent loss. The pulp tank 15 is provided with a jacket 16 into which cool water passes from an inlet 17 to an outlet 18. The ore is introduced into pulp tank 15 through inlet 19 and, at the same time, the solvent, as for example, trichloroethylene, is introduced through inlet 20. It has been found that where the ore contains about 20 percent sulfur, the weight ratio of the ore to the solvent should be approximately 1 to 4; that is, 1 part ore to 4 parts solvent. This ratio may be adjusted depending upon the sulfur content of the ore itself, that is, the higher the sulfur content, the greater the ratio of solvent used.

The temperature in the pulping tank 15 is approximately ambient of room temperature, due to the presence of the cooling water in the jacket. The temperature is controlled to prevent the undesirable return of vaporized solvent to the inlet 19 which might occur if the pulp tank 15 were heated. The time during which the ore and solvent remain in contact in this pulping operation is approximately 2 to 15 minutes. Thorough solvent-ore contact is assured in the pulping operation by means of the agitator 21 which is driven by the motor 22.

As illustrated, after the ore and the solvent have passed through the pulping operation, the resultant slurry passes through a three-stage leaching operation. In the first stage, the slurry is fed through the line 23 to the first sealed leaching tank 24. This leaching tank is provided with a jacket 25 through which water or steam to maintain a temperature of between 90° and 140° F. passes from the inlet 26 to the outlet 27. It is to be understood that while throughout this description, the means for maintaining the temperature of various tanks or vessels have been described as hot water or steam, any other heating means such as hot oil, electricity, etc., may be utilized to maintain and control the desired temperatures. During a period of approximately 15 minutes, the slurry is stirred by means of agitator 28 which is driven by the motor 29. However, practically no corrosion or similar wear takes place due to the pH adjustment of the ore in the initial steps as heretofore described. Corrosion, which would normally be caused by the degradation of the solvent, is prevented because of the presence of the alkaline substance which it has been found, when used in crushed or powdered form not only reacts with any acids produced by the results in the leaching tanks, but also acts as a buffer for the system.

The slurry is then fed into a second stage sealed leaching tank, 30, through valved line 31. The second leaching tank is heated by a jacket 32 and is maintained at a temperature of about 150° to 175° F. by means of hot water passing through the jacket from the inlet 33 to the outlet 34. The mixture is agitated in this leaching tank for a period of between approximately 5 to approximately 30 minutes by means of agitator 35 which is driven by the motor 36.

This second leaching tank provides for the extraction of additional sulfur which was not placed in solution during the first leaching operation heretofore described. The residence time in the second leaching tank enhances this extraction and by the time the solvent emerges from the second leaching tank 30, the major portion of sulfur has been extracted from the ore and dissolved into the solvent which is substantially sulfur-laden. However, a minor portion of sulfur at this point may remain in the ore and therefore the leaching system comprises a three-stage leaching operation. In the third stage of this leaching process, the slurry is fed into a third sealed leaching tank, 37, through the valved line 38. An insulated jacket 39 is provided around this leaching tank to maintain the temperature at between approximately 150° to approximately 175° F. This temperature control is maintained by the passage of hot water from the inlet 40 through the jacket and out the outlet 41. During this process, the slurry is mixed by means of the agitator 42 in the tank 37 which is driven by the motor 43. The agitation process takes place over a period of time ranging from about 5 minutes to about 30 minutes. At the end of this stage of the three-stage leaching operation, virtually all of the sulfur present in the ore has been dissolved and recovered into the solvent. While the solvent is completely saturated, it will flow in the form of a slurry together with the leached residue through valved pipeline 44 into a sealed centrifuge 45. The centrifuge is provided with an insulated jacket 46 and the temperature of the centrifuge is maintained between about 150° to about 175° F. by means of hot water flowing through the jacket from inlet 47 to outlet 48. The centrifuge may comprise any one of several known types; however, as set forth for exemplary purposes only, the centrifuge illustrated is a conical solid bowl centrifuge. In this centrifuge 45, the sulfur saturated solvent, which is in liquid form, is separated from the leached sulfur free residue. The leached residue is passed to the dryer 49 by a screw conveyor 50. At this point, as described, the leached residue is free of sulfur which in the recovery of other minerals, would be considered an impurity. As a consequence, the present invention provides an additional advantage in that minerals other than sulfur, such as pyrites and the like, may be economically and easily recovered from the leached residue, in extremely high grade form by any well-known method.

The dryer 49 is provided with an insulated jacket 51 through which hot water passes from inlet 52 to outlet 53. The dryer is maintained at a temperature of between approximately 200° to approximately 240° F. and the residence time of the leached residue in the dryer is between about 20 minutes to about 1 hour. In addition, hot water is passed directly through the hollow center of the screw and hollow flights of the screw from inlet 52a to outlet 53a to control the desired temperature throughout the dryer. While one form of dryer has been illustrated, it is to be noted that this illustration is merely to facilitate an understanding of the invention and other well-known types of dryers may be utilized. In accordance with the present invention, means are provided to recapture and recycle solvent from every sealed stage in which solvent vapors are present. The solvent vapors emitted from the dryer are fed through valved vapor duct 54 into a condenser 55 hereinafter described for the purpose of producing pure solvent to be reintroduced in liquid form intermediate the processing without solvent loss.

At the same time that the leached residue is passing through the dryer, the sulfur saturated solvent is fed through valved pipeline 56 into a sealed water separator 57. In this water separator, the remaining water and the solvent will separate because of their immiscibility and difference in specific gravity. The water is removed continuously through the valved pipe 58. The water separator is also provided with an insulated jacket 59 through which hot water is fed from inlet 60 to outlet 61. The temperature in the water separator is maintained and controlled between about 150° F. to about 175° F. and the mixture remains in the water separator for a time of between 5 to 30 minutes. As the water is discharged from the water separator, the solvent is also fed out of the separator continuously through the pipe 62 into a sealed polishing filter 63.

The polishing filter is provided with an insulated jacket 64 and is maintained at a temperature of between approximately 150° F. to approximately 175° F. by means of hot water being fed to the jacket from inlet 65 to outlet 66. In this polish filtering operation, the sulfur saturated solvent is polished to remove any residual particulate matter which has been entrained in the solvent so that the sulfur saturated solvent is completely freed of all entrained solids. The heated, polished sulfur saturated solvent is then fed through valved pipeline 67 into a sealed crystallizer 68. While the crystallizer may be of any one of several forms, we prefer to use the new and novel crystallizer described and claimed in a copending application filed of even date herewith.

In the crystallizer the pure sulfur is crystallized from the solvent into rhombic crystals of various sizes, depending upon the dwell time, the heat differential, and other variable factors. After crystallization of the sulfur, both the crystals and the solvent pass through valved pipeline 69 as a slurry into another sealed centrifuge 70. While the centrifuge may be of various designs all encompassed within the scope of the present invention, we prefer to use the conical solid bowl type centrifuge as described in connection with centrifuge 45. The crystallization of sulfur in the crystallizer takes place by cooling the hot solvent from the polish filter 63 to ambient or room temperature in the crystallizer itself. The centrifuge 70 is also maintained at ambient temperature and therein, the pure liquid solvent is separated from the crystallized solid sulfur. The crystallized solid sulfur passes into a screw conveyor 71.

The screw conveyor of the present invention is, in itself, of a new and novel design which insures the complete recovery of pure sulfur from the solvent while providing a vapor lock against the return of vaporized solvent into the centrifuge 70.

As shown, the screw conveyor 71 is divided in effect into two compartments 71a and 71b which actually contain the screw conveyor means. Intermediate to the compartments 71a and 71b is a hollow compartment 71c which does not contain any screw means. Thus as the sulfur crystals are passed into the sealed dryer 72 through duct 73, a solid block of crystals is formed at all times in the intermediate compartment 71c. This formation prevents the return of any vapors from the dryer 72 to the crystallizer 68. The screw conveyor 71 and all compartments 71a, 71b and 71c are maintained at ambient or room temperature. The sulfur crystals as aforesaid are then discharged through duct 73 into a dryer 72. The dryer 72 is provided with an insulated jacket 74 and is maintained at a temperature of between about 200° to about 240° F. by the passage of hot water or steam from inlet 75 to outlet 76. Furthermore, hot water is passed directly through the hollow center and hollow flights of the screw from inlet 75a to outlet 76a. The vaporized solvent which may be present together with the pure solid sulfur crystals is then passed through the vapor duct line 77 to the condenser 55, thus at this stage of the processing according to the present invention, all of the solvent is reclaimed and recycled.

At the same time that the solid crystallized pure sulfur is passing into the screw conveyor 71 and thence to the dryer 72, the lean solvent is being fed through valved pipeline 78, into a sealed water separator 79. The water separator 79 is maintained at ambient or room temperature and the water is separated. The water passes through pipeline 80 while the lean solvent is fed through valved pipeline 81 to be returned to the initial leaching operation through inlet 19 on pulp tank 15.

An example of the processing operation is set forth in the following table.

TABLE I.—PROCESS CONDITIONS

[Continous feed and exit rates]

| Process equipment | Residence time, min. | Temperature, ° F. |
|---|---|---|
| Pulp tank | 10 | Ambient.[1] |
| First stage leach tank | 15 | 120. |
| Second stage leach tank | 20 | 155. |
| Third stage leach tank | 20 | 155. |
| Residue-solvent separator | 2 | 155. |
| Residue dryer | 60 | 200 to 240.[2] |
| First water separator | 10 | 155. |
| Polishing filter | | 155. |
| Crystallizer | 100 | 155 to ambient [1,2] |
| Sulfur separator | 1-2 | Ambient.[1] |
| Screw conveyor | | Ambient.[1] |
| Sulfur dryer | 45 | 200 to 240.[2] |
| Second water separator | 10 | Ambient.[1] |

[1] Ambient means plant or roome temperature.
[2] Temperature gradient from inlet to discharge.

Thus, in the solvent circulating process of the present invention, the lean liquid solvent recovered from the terminal point of the process is reintroduced into the leaching operations. While sulfur is leached from the ore during this step, the present invention contemplates recovery of all sulfur present in the ore. To accomplish this, the solvent vapors present at separate stages in the processing operation are fed to a condenser and condensed pure solvent is thereby recycled to the first centrifuge which is intermediate the processing line. At this point, any dissolved sulfur in the leached residue is recovered due to the final washing of the leached residue by the pure solvent. This process provides for the complete recovery and reuse of the solvent present in the system and the recovery of all sulfur from the sulfur bearing ore. The solvent utilized to wash the leached residue is then recirculated through the system in the manner heretofore described.

One of the features and advantages of the present invention is the provision of virtually sulfur free mineral bearing leached residue. Thus the process of the invention although primarily concerned with the recovery of crystalline sulfur, may also be considered to be a process for the treatment of metal bearing ores to remove sulfur impurities and to provide a substantially more concentrated ore feed.

It will be understood that while the process and apparatus of the present invention have been described in detail, the invention is not limited to the specific steps or equipment described which may be varied or modified without departing from the scope of the following claims.

What is claimed is:

1. A process for the continuous recycle of a solvent to recover elemental sulfur from sulfur laden ore which comprises the steps of:

comminuting a sulfur laden ore;

admixing therewith an alkaline material selected from the group consisting of limestone, trona, and soda ash, in an amount sufficient to maintain the solution pH of the mixture within the range of from about 3 to about 9;

contacting said mixture with a hot solvent selected from the group consisting of trichloroethylene, perchloroethylene and liquid hydrocarbons in a pulping and leaching zone at a temperature below the melting point of sulfur to obtain a sulfur laden solvent and a solid leached residue;

separating the sulfur laden solvent from the solid leached residue;

drying the solid leached residue in a heated vessel to vaporize any solvent remaining therein;

passing said solvent vapors to a condensing zone to condense said vapors;

returning the condensed solvent to said pulping and leaching zone;

passing said separated sulfur laden solvent to a water separation zone;

allowing said sulfur laden solvent to remain in said water separation zone for a period of time sufficient to allow water in said solvent to separate therefrom;

withdrawing said separated water from said separation zone;

passing the water free sulfur laden solvent from said water separation zone to a crystallizing zone;

cooling said sulfur laden solvent to obtain crystalline sulfur and a sulfur lean solvent; separating said crystalline sulfur from said sulfur lean solvent;

returning said sulfur lean solvent to said pulping and leaching zone; passing said crystalline sulfur through a chamber with a dry seal lock, to prevent backflow of solvent vapors, and into a drying zone;

drying the crystallized sulfur in a heated vessel to vaporize any solvent remaining in said sulfur;

passing said solvent vapor to a condensing zone to condense said vapor; and returning the condensed solvent to said pulping and leaching zone.

2. A process for the continuous recycling of a solvent to recover elemental sulfur from a sulfur bearing ore which comprises the steps of:

comminuting a sulfur bearing ore in a crushing zone; admixing therewith an alkaline material selected from the group consisting of limestone, trona, and soda ash, in an amount sufficient to maintain the solution pH of the mixture within the range of from about 3 to about 9;

contacting the mixture thereof with a solvent selected from the group consisting of trichloroethylene, perchloroethylene, and liquid hydrocarbons in a pulping and leaching zone to obtain a solid leached residue and a sulfur laden solvent;

separating said sulfur laden solvent from said leached residue in a first separation zone;

passing said leached residue to a first vaporization zone wherein residual solvent in said leached residue is vaporized therefrom;

passing said solvent vapors from said first vaporization zone to a condensing zone wherein said solvent vapors are condensed to solvent liquid;

recycling said condensed solvent liquid to said pulping and leaching zone;

removing said leached residue from said first vaporization zone;

passing said separated sulfur laden solvent from said first separation zone to a water separation zone;

allowing said sulfur laden solvent to remain in said water separation zone for a period of time sufficient to allow water in said solvent to separate therefrom;

withdrawing said separated water from said separation zone;

passing the water-free sulfur laden solvent from said water separation zone to a crystallizing zone;

crystallizing sulfur from said sulfur laden solvent in said crystallizing zone to form a slurry of crystalline sulfur and substantially sulfur-free lean solvent;

passing said slurry to a second separation zone;

separating crystalline sulfur from substantially sulfur-free lean solvent in said second separation zone;

recycling said separated sulfur-free lean solvent to said pulping and leaching zone;

passing the separated crystalline sulfur from said separation zone through a chamber with a dry seal lock, to prevent backflow of solvent vapors, and into a second vaporization zone;

vaporizing any residual solvent from said crystalline sulfur in said second vaporization zone;

passing said solvent vapors to a condensing zone to condense said vapors to solvent liquid;

recycling said solvent liquid to the pulping and leaching zone; and withdrawing crystalline sulfur from said second vaporization zone.

3. A process according to claim 2 wherein said condensed vapors from said second vaporization zone are recycled to said first separation zone.

4. A process according to claim 2 wherein at least one of said separation zones comprises a centrifugation zone.

5. A process for the continuous recycling of a solvent to recover elemental sulfur from a sulfur bearing ore which comprises the steps of:

comminuting a sulfur bearing ore in a crushing zone;

admixing therewith an alkaline material selected from the group consisting of limestone, trona, and soda ash, in an amount sufficient to maintain the solution pH of the mixture within the range of from about 3 to about 9;

contacting the mixture thereof with a solvent selected from the group consisting of trichloroethylene, perchloroethylene and liquid hydrocarbons in a pulping and leaching zone to obtain a solid leached residue and a sulfur laden solvent;

separating said sulfur laden solvent from said leached residue in a first separation zone;

passing said leached residue to a first vaporization zone wherein residual solvent in said leached residue is vaporized therefrom;

passing said solvent vapors from said first vaporization zone to a condensing zone wherein said solvent vapors are condensed to solvent liquid;

recycling said condensed solvent liquid to said pulping and leaching zone; removing said leached residue from said first vaporization zone; passing said separated sulfur laden solvent from said first separation zone to a water separation zone;

allowing said sulfur laden solvent to remain in said water separation zone for a period of time sufficient to allow water in said solvent to separate therefrom;

withdrawing said separated water from said water separation zone;

passing the water-free sulfur laden solvent from said water separation zone to a crystallizing zone;

crystallizing sulfur from said sulfur laden solvent in said crystallizing zone to form a slurry of crystalline sulfur and substantially sulfur-free lean solvent;

passing said slurry to a second separation zone;

separating crystalline sulfur from substantially sulfur-free lean solvent in said second separation zone;

recycling said separated sulfur-free lean solvent to said pulping and leaching zone;

passing the separated crystalline sulfur from said separation zone through a chamber with a dry seal lock, to prevent backflow of solvent vapors, and into a second vaporization zone;

vaporizing any residual solvent from said crystalline sulfur in said second vaporization zone;

passing said solvent vapors to a condensing zone to condense said vapors to solvent liquid;

recycling said solvent liquid to the pulping and leaching zone;

withdrawing crystalline sulfur from said second vaporization zone.

* * * * *